United States Patent
Miao et al.

(10) Patent No.: US 10,098,030 B2
(45) Date of Patent: Oct. 9, 2018

(54) METHOD AND APPARATUS FOR MEASUREMENT AND REPORT

(71) Applicant: Telefonaktiebolaget LM Ericsson (publ), Stockholm (SE)

(72) Inventors: Qingyu Miao, Beijing (CN); Jinhua Liu, Beijing (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 161 days.

(21) Appl. No.: 15/036,497

(22) PCT Filed: Aug. 20, 2015

(86) PCT No.: PCT/CN2015/087689
§ 371 (c)(1),
(2) Date: May 13, 2016

(87) PCT Pub. No.: WO2017/028315
PCT Pub. Date: Feb. 23, 2017

(65) Prior Publication Data
US 2017/0188252 A1    Jun. 29, 2017

(51) Int. Cl.
*H04W 24/10* (2009.01)
*H04L 5/00* (2006.01)
*H04W 8/02* (2009.01)

(52) U.S. Cl.
CPC ........... *H04W 24/10* (2013.01); *H04L 5/0048* (2013.01); *H04W 8/02* (2013.01)

(58) Field of Classification Search
None
See application file for complete search history.

(56) References Cited

U.S. PATENT DOCUMENTS

| | | | |
|---|---|---|---|
| 2010/0075705 | A1 | 3/2010 | van Rensburg et al. |
| 2011/0300857 | A1* | 12/2011 | Kazmi .................. H04L 1/0006 455/423 |
| 2012/0057538 | A1* | 3/2012 | Adhikari ............... H04L 1/0025 370/329 |

(Continued)

FOREIGN PATENT DOCUMENTS

| | | |
|---|---|---|
| CN | 101808381 A | 8/2010 |
| CN | 101841936 A | 9/2010 |
| CN | 104640178 A | 5/2015 |

OTHER PUBLICATIONS

International Search Report and Written Opinion dated May 18, 2016 in International application No. PCT/CN2015/087689, 8 pages.

*Primary Examiner* — Diane Lo
(74) *Attorney, Agent, or Firm* — Rothwell, Figg, Ernst & Manbeck, p.c.

(57) ABSTRACT

Embodiments of the present disclosure provide a method implemented by an access node in a wireless communication system for beam switch, comprising: selecting a transmission mode from a set of predefined transmission modes; transmitting a reference signal to a device according to the selected transmission mode; signaling the selected transmission mode to the device; and receiving, from the device, a mobility measurement report based on the reference signal. By virtue of this method, the signaling overhead for reference signal configuration can be reduced.

40 Claims, 9 Drawing Sheets

(56) References Cited

U.S. PATENT DOCUMENTS

| | | | |
|---|---|---|---|
| 2012/0058791 A1* | 3/2012 | Bhattad | H04L 1/0606 455/509 |
| 2012/0213113 A1* | 8/2012 | Zhao | H04B 7/0626 370/252 |
| 2012/0307772 A1* | 12/2012 | Kwon | H04L 5/0007 370/329 |
| 2012/0315892 A1 | 12/2012 | Chin | |
| 2014/0301298 A1* | 10/2014 | Luo | H04L 5/0053 370/329 |
| 2016/0337021 A1* | 11/2016 | Sung | H04B 7/0632 |

* cited by examiner

METHOD AND APPARATUS FOR MEASUREMENT AND REPORT

CROSS-REFERENCE TO RELATED APPLICATION

This application is a 35 U.S.C. § 371 National Phase Entry Application from PCT/CN2015/087689, filed Aug. 20, 2015, and designating the United States.

TECHNICAL FIELD

The non-limiting and exemplary embodiments of the present disclosure generally relate to the technical field of wireless communications, and specifically to a method and apparatus for measurement and report.

BACKGROUND

This section introduces aspects that may facilitate a better understanding of the disclosure. Accordingly, the statements of this section are to be read in this light and are not to be understood as admissions about what is in the prior art or what is not in the prior art.

In a cellular wireless communication system, for example a Long Term Evolution (LTE) system, a terminal device moves from one cell to another. A mobility procedure is defined for specifying operations of the terminal device (e.g., a user equipment, or UE) and base stations (BSs) to support the mobility. In LTE systems, an active mode mobility procedure as shown in FIG. 1 is defined, for specifying signaling exchanges between an active mode UE and base stations which are also called evolved NodeBs or eNBs in LTE, and interacting between the base stations to support a handover of the UE. As shown in FIG. 1, UE measures signal quality (for example, reference signal receiving power (RSRP)) of its serving cell and neighboring cells based on cell-specific reference signals (CRSs). The UE will send a measurement report to its serving eNB following a predefined criterion, for example, the UE will send the measurement report if a signal quality of a neighbor cell is better than that of its serving cell by a preconfigured offset. Based on the measurement report, the serving eNB is aware of the best cell for the UE. If the best cell is not the current serving cell, the serving eNB can notify the UE to handover to the best cell.

In a next generation or fifth generation (NX/5G) wireless system being discussed, for example in the third generation partnership project (3GPP), there is no concept of cell anymore. A terminal device is within coverage of a beam, and mobility means that the terminal device moves from one beam controlled by an access node (AN) to another beam controlled by the same AN or a different AN node.

SUMMARY

Various embodiments of the present disclosure mainly aim at providing a method and apparatus for reducing signaling overhead in wireless networks. Other features and advantages of embodiments of the present disclosure will also be understood from the following description of specific embodiments when read in conjunction with the accompanying drawings, which illustrate, by way of example, the principles of embodiments of the present disclosure.

In a first aspect of the disclosure, there is provided a method implemented by an access node in a wireless communication system for beam switch. The method comprises selecting a transmission mode from a set of predefined transmission modes; transmitting a reference signal to a device according to the selected transmission mode; signaling the selected transmission mode to the device; and receiving, from the device, a mobility measurement report based on the reference signal.

In one embodiment, in the method, selecting a transmission mode from a set of predefined transmission modes may comprise selecting the transmission mode from the set of predefined transmission modes based on at least one of the following: traffic load of the access node, traffic load of a cluster of access nodes that include the access node, traffic load of the wireless communication system, an area that needs fast mobility procedure, moving speed of the device, moving speed of a further device in the wireless communication system, and a latency requirement for an on-going session.

In another embodiment, the set of predefined transmission modes may include at least one of a periodical transmission mode and an on-demand transmission mode.

In one embodiment, selecting a transmission mode from a set of predefined transmission modes may comprise selecting the transmission mode from the set of predefined transmission modes based on one of the following: a requested amount of the reference signal, and both the requested amount of the reference signal and an available amount of the reference signal in the wireless communication system.

In another embodiment, the method may further comprise receiving, from a control node in the wireless communication system (220), an indication for transmission mode selection, and wherein selecting a transmission mode from a set of predefined transmission modes may comprise selecting the transmission mode from the set of predefined transmission modes based on the received indication.

In still another embodiment, signaling the selected transmission mode to the device may comprise transmitting the selected transmission mode to the device (203, 204, 205, 206) via one of the following: a broadcasting signaling, and a signaling specific to the device during service setup or an on-going session.

In one embodiment, signaling the selected transmission mode to the device may comprises signaling the selected transmission mode to the device in response to transmission of the reference signal being triggered by the device.

In another embodiment, signaling the selected transmission mode to the device may further comprises signaling a reporting mode corresponding to the selected transmission mode to the device. In one embodiment, signaling a reporting mode corresponding to the selected transmission mode to the device may comprise: if the selected transmission mode is a periodical transmission mode, signaling an event-triggered report mode for the mobility measurement report; and if the selected mode is an on-demand transmission mode, signaling a measurement command based report mode for the mobility measurement report.

In one embodiment, the method may further comprise signaling the selected transmission mode to a neighbor access node in the wireless communication system.

In one embodiment, the selected transmission mode may be specific to the device.

In another embodiment, the reference signal is a mobility reference signal (MRS) enabling measurement for a beam in a beam switch procedure.

In still another embodiment, the mobility measurement report is for intra-node beam switch or inter-node beam switch.

In a second aspect of the present disclosure, there is provided a method implemented by a device in a wireless communication system for beam switch. The method comprises: receiving, from an access node, a transmission mode indicator indicating a transmission mode selected from a set of predefined transmission modes; receiving a reference signal from the access node according to the indicated transmission mode; generating a mobility measurement report based on the reference signal; and transmitting the mobility measurement report to the access node.

In one embodiment, in the method, the set of predefined transmission modes may include at least one of a periodical transmission mode and an on-demand transmission mode.

In one embodiment, the indicated transmission mode may be specific to the device.

In another embodiment, receiving, from an access node, a transmission mode indicator may comprises receiving the transmission mode indicator from the access node via a broadcasting signaling, or a signaling specific to the device during service setup or an on-going session.

In still another embodiment, receiving, from an access node, a transmission mode indicator may further comprises receiving, from the access node, a reporting mode indicator indicating a reporting mode corresponding to the transmission mode, and wherein transmitting the mobility measurement report to the access node may comprise transmitting the mobility measurement report to the access node based on the reporting mode. In one further embodiment, receiving, from the access node, a reporting mode indicator indicating a reporting mode corresponding to the transmission mode may include receiving, from the access node, a reporting mode indicator indicating an event-triggered reporting mode for the mobility measurement report, if the transmission mode is a periodical transmission mode, and receiving, from the access node, a reporting mode indicator indicating a measurement command based reporting mode for the mobility measurement report, if the transmission mode is an on-demand transmission mode.

In one embodiment, in the method, the reference signal is a mobility reference signal (MRS) enabling measurement for a beam in a beam switch procedure.

In another embodiment, the mobility measurement report is for intra-node or inter-node beam switch.

In a third aspect of the present disclosure, there is provided an apparatus in an access node in a wireless communication system for beam switch. The apparatus comprises: a transmission mode controller, configured to select a transmission mode from a set of predefined transmission modes; a first transmitter, configured to transmit a reference signal to a device according to the selected transmission mode; a second transmitter, configured to signal the selected transmission mode to the device; and a first receiver, configured to receive, from the device, a mobility measurement report based on the reference signal.

In a fourth aspect of the present disclosure, there is provided an apparatus implemented in a device in a wireless communication system for beam switch. The apparatus comprises a first receiver, configured to receive, from an access node, a transmission mode indicator indicating a transmission mode selected from a set of predefined transmission modes; a second receiver, configured to receive a reference signal from the access node according to the indicated transmission mode; a report generator, configured to generate a mobility measurement report based on the reference signal; and a transmitter, configured to transmit the mobility measurement report to the access node.

In a fifth aspect of the present disclosure, there is provided an apparatus in a wireless communication system. The apparatus may comprise a processor and a memory. The memory may contain instructions executable by the processor whereby the apparatus is operative to perform the method according to the first aspect of the present disclosure.

In a sixth aspect of the present disclosure, there is provided an apparatus in a wireless communication system. The apparatus may comprise a processor and a memory. The memory may contain instructions executable by the processor whereby the apparatus is operative to perform the method according to the second aspect of the present disclosure.

In a seventh aspect of the disclosure, there is provided an apparatus in a wireless communication system. The apparatus may comprise process means adapted to perform any method in accordance with the first aspect of the disclosure.

In an eighth aspect of the disclosure, there is provided an apparatus in a wireless communication system. The apparatus may comprise process means adapted to perform any method in accordance with the second aspect of the disclosure.

In a ninth aspect of the disclosure, there is provided a computer program, comprising instructions which, when executed on at least one processor, cause the at least one processor to carry out the method according to the first aspect of the disclosure.

In a tenth aspect of the disclosure, there is provided a computer program, comprising instructions which, when executed on at least one processor, cause the at least one processor to carry out the method according to the second aspect of the disclosure.

According to the various aspects and embodiments as mentioned above, by configuring transmission mode adaptively according to operating conditions, signaling overhead can be reduced and mobility performance can be improved.

BRIEF DESCRIPTION OF THE DRAWINGS

The above and other aspects, features, and benefits of various embodiments of the present disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which.

DETAILED DESCRIPTION

Figure 1:
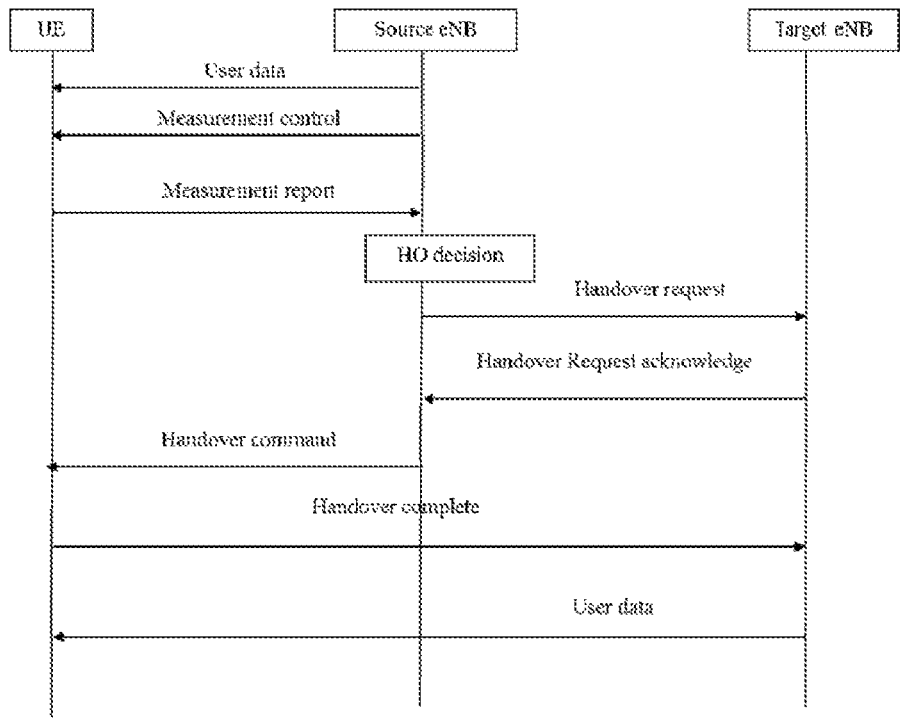
FIG. 1 illustrates an active mode mobility procedure used in a conventional LTE system.

Hereinafter, the principle and spirit of the present disclosure will be described with reference to illustrative embodiments. It should be understood, all these embodiments are given merely for one skilled in the art to better understand and further practice the present disclosure, but not for limiting the scope of the present disclosure. For example, features illustrated or described as part of one embodiment may be used with another embodiment to yield still a further embodiment. In the interest of clarity, not all features of an actual implementation are described in this specification.

References in the specification to "one embodiment," "an embodiment," "an example embodiment," etc. indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that, although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

The terminology used herein is for the purpose of describing particular embodiments only and is not intended to be liming of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs. For example, the term "terminal device" used herein may refer to any terminal or user equipment (UE) having wireless communication capabilities, including but not limited to, mobile phones, cellular phones, smart phones, or personal digital assistants (PDAs), portable computers, image capture devices such as digital cameras, gaming devices, music storage and playback appliances, wearable devices and the like. In the following description, the terms "user equipment" or "UE" and "terminal device" may be used interchangeably. Similarly, the term "access node" may represent a base station (BS), a node B (NodeB or NB), an evolved NodeB (eNodeB or eNB), a Remote Radio Unit (RRU), a radio header (RH), a remote radio head (RRH), a relay, a low power node such as a femto, a pico, an access point (AP) and so forth. The MRS here can be any type of reference signal, including but not limited to, pilot, reference, and preamble.

For illustrative purposes, several embodiments of the present disclosure will be described in the context of a 3GPP LTE system. Those skilled in the art will appreciate, however, that the concept and principle of the several embodiments of the present disclosure may be more generally applicable to other wireless networks, for example an ad-hoc network.

Conventional active mode mobility procedure for LTE has been briefly introduced above in conjunction with FIG. 1. More particularly, UE reports a signal quality measured based on the CRS to its serving eNB, for the eNB to determine which is the best cell for the UE and whether handover is required. In current LTE system, the CRS is transmitted by the eNB in all downlink subframes, so that UE can measure it at any time. The measurement report can be periodic and event-triggered.

Figure 2:
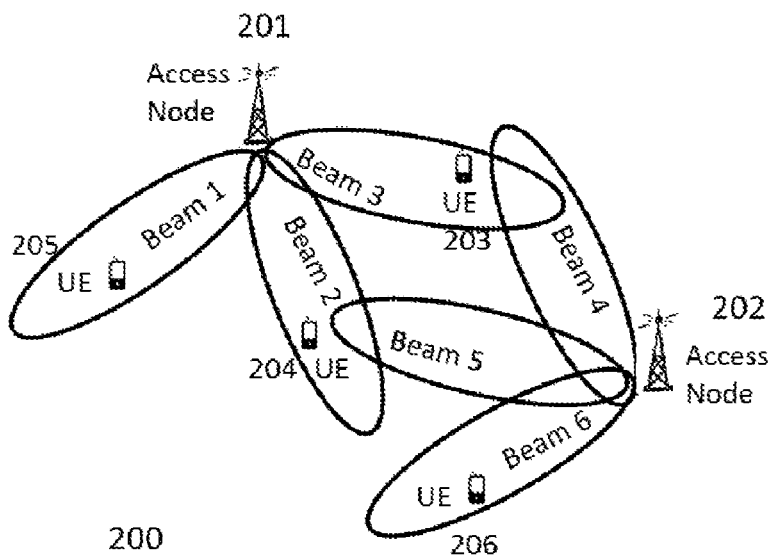
FIG. 2 illustrates an exemplary wireless communication system 200 in which embodiments of the disclosure may be implemented.

In a future wireless system, e.g., a 5G wireless system, an AN may provide a large number of beams, with each beam serving a plurality of UEs, as shown in FIG. 2 which illustrates an exemplary wireless communication system 200 in which embodiments of the disclosure may be implemented. As shown in FIG. 2, the wireless communication system 200 may comprise one or more access nodes, e.g., 201 and 202, which may be in form of eNBs. It will be appreciated that the access nodes 201 and 202 could also be in the form of Node Bs, BTSs (Base Transceiver Stations), BS (Base Station) and/or BSSs (Base Station Subsystems), etc. The access node (e.g., node 201) provides radio connectivity to a plurality of UEs (e.g., UEs 203-205) within coverage of its beams (e.g., beam 1, beam 2 and beam 3). UE may be switched from one beam to another beam due to mobility. For example, UE 203 in FIG. 2 may be switched from beam 3 to beam 4 as it moves towards the access node 202.

To facilitate beam switch, the signal quality of potential beams, including serving beam and neighboring beams, may be measured. The measurement for each potential beam may be done based on a mobility reference signal (MRS) from an access node. To reduce the overhead, the MRS is not always transmitted as conventional CRS. Instead, the MRS is activated only when it is necessary. When there are several ANs involved in mobility measurement, each involved AN shall send specific MRS at a request sent from current serving AN of the UE via an inter-AN signaling. To reduce blind detection attempts, the UE is informed by its serving AN of which MRSs are to be measured. According to measurement reports from the UE, network side (i.e., the AN) knows the best beam for the UE. If the best beam is not the current serving beam, the network side notifies the UE to switch to the best beam optionally and starts to serve UE using that beam.

Figure 3:
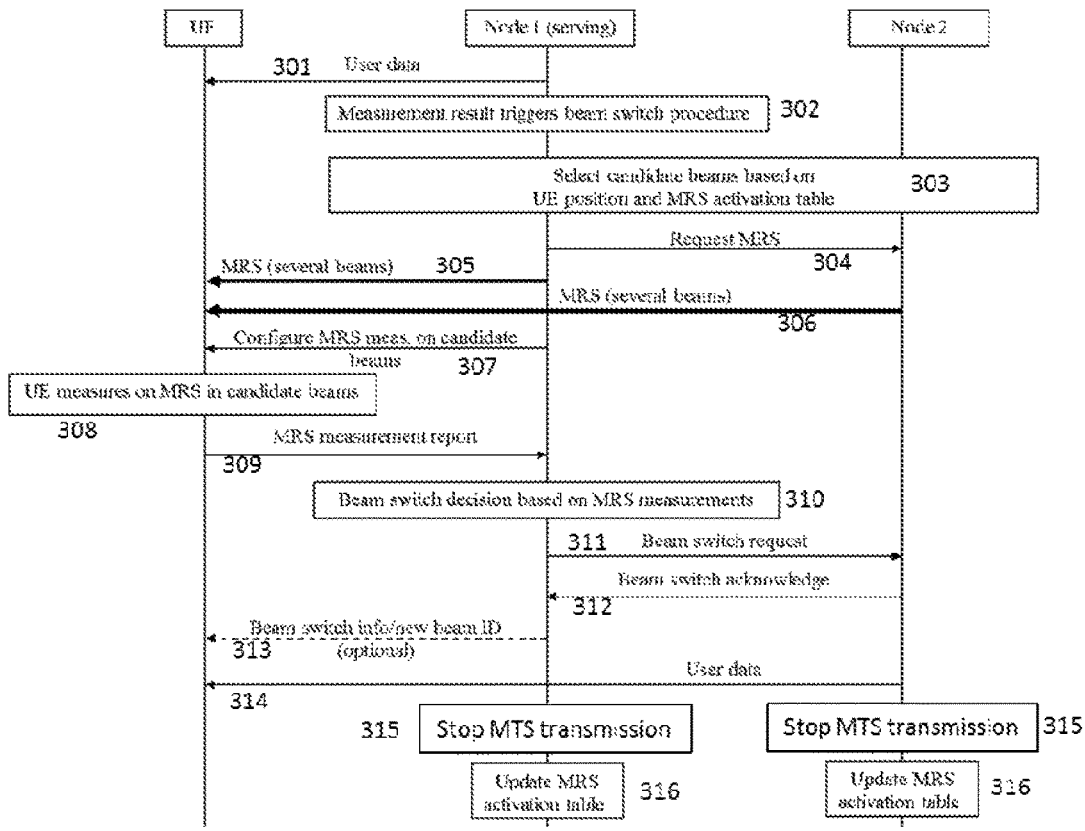
FIG. 3 illustrates a potential active mode mobility procedure for beam switch.

An active mode mobility procedure for beam switch is shown in FIG. 3. As shown in FIG. 3, an active UE is in communication with its serving access node which is denoted as Node 1. Node 1 may transmit (301) user data to the UE and collect measurement result from it. The measurement result may trigger a beam switch procedure (302). To get the best beam for the UE, Node 1 may select (303) candidate beams, for example, based on position of the UE and a MRS activation table which defines mapping relationship between MRSs and positions, and then request (304)

corresponding MRSs from a neighbor access node which is denoted as Node 2. Then, both Node 1 and Node 2 start to transmit (305, 306) MRS, and Node 1 configures (307) the UE to measure MRSs of candidate beams. The UE measures (308) MRSs of candidate beams according to the configuration, and report (309) measurement results to Node 1. Based on the report of measurement, Node 1 makes decision (310) on beam switch, and send beam switch request (311) to a corresponding node, namely, Node 2. After getting beam switch acknowledgement (312) from the Node 2, Node 1 can inform the beam switch or new beam ID to the UE (313). After that, the UE is served with the new beam from Node 2 (314). The MRS transmission from both Node 1 and Node 2 can be stopped (315), unless there is still requirement for the MRS transmission for other purpose, e.g., for another UE to measure. Additionally, the MRS activation table at both Node 1 and Node 2 may be updated (316), for example, based on the reported measurement results from the UE.

As shown in FIG. 3, the MRS is not always transmitted, but is triggered by certain event, for example, MRS from a neighbor node can be transmitted upon request (304) from the serving node, and the request may be triggered by measurement results from the UE. It means that inter-AN signaling is required to trigger MRS transmission from a neighbor Node. When load in a network is relatively high or there are a large number of UEs with fast mobility to be supported in the network, there can be much requirement for MRS transmission, and actually all the MRSs might be activated due to a large number of beam measurement demands Due to a large amount of signaling required to trigger the MRS transmission, the on-demand MRS transmission scheme may not save signaling overhead in some high load scenarios, for instance, in busy hours of stadiums, cinema, squares, supper market/big malls, and the like. The large amount of signaling required to support on-demand MRS transmission may be caused by one or more of the following reasons.

First, there is a large number of associated MRS configuration signaling from the serving AN to UE in the air interface, to indicate the demand for beam measurement. For each beam switch, the network needs to notify UE when and which subset of MRS sequences to measure. It leads to many signaling transmissions to the UE to activate and deactivate the MRS measurement (for example, via 307 shown in FIG. 3). All these signaling cause additional overhead in the air interface.

Second, there is a large number of MRS activation and de-activation signaling (for example, 304 shown in FIG. 3) between different Nodes. This introduces more overhead in the backhaul. Furthermore, the inter-Node signaling increases latency in the beam measurement procedure. For high mobility UE, the increased latency for determining a best beam has a negative impact on the UE experience.

Third, no matter whether current serving beam is the best beam or not, the UE shall send a measurement report (309) whenever a MRS measurement is triggered, however, it may be unnecessary to report the measurement results if current serving beam is still the best beam.

In view of the above concerns, following embodiments of the present disclosure provide solutions adapted for wireless communication, which may address one or more of the aforesaid disadvantages of the existing mobility procedure. However, it will be appreciated by those skilled in the art that the principle of the solution can also apply to a wireless system to improve any other procedures, for example, to reduce signaling overhead involved in reference signal configuration, or in measurement and report operations.

Hereafter, the solutions for wireless communication according to embodiments of the present disclosure will be described in details with reference to FIGS. 4a-8.

Figure 4A:
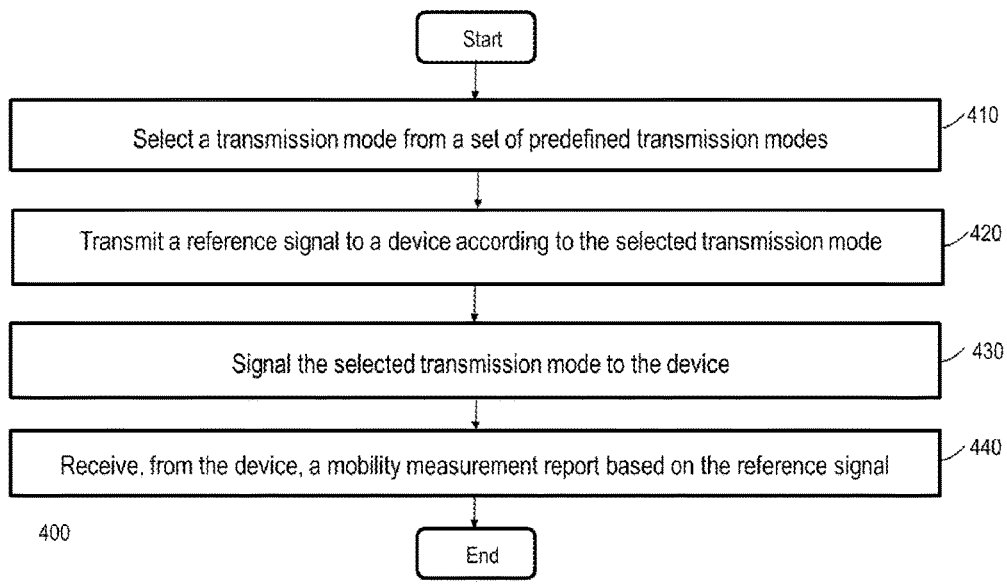
FIGS. 4a-4i illustrate flowcharts or state transition diagram of a method 400 for wireless communication according to an embodiment of the present disclosure.

Reference is now made to FIG. 4a, which shows a flowchart of a method 400 for wireless communication according to an embodiment of the present disclosure. In one embodiment, the method 400 may be implemented by an access node, for example the access node 201 or 202 as shown in FIG. 2.

As illustrated, the method 400 comprises selecting a transmission mode from a set of predefined transmission modes in block 410; transmitting a reference signal to a device, such as UE 203, according to the selected transmission mode in block 420; in block 430, signaling the selected transmission mode to the device; and receiving from the device a mobility measurement report based on the reference signal in block 440.

With embodiments of the disclosure, multiple transmission modes can be predefined, and different transmission modes can be adaptively activated and deactivated according to different situations to save signaling overhead and optimize the mobility performance.

In one embodiment, the reference signal transmitted in block 420 can be MRS enabling measurement for a beam in a beam switch procedure. Accordingly, the transmission mode selected in block 410 can be a MRS transmission mode. This is just for exemplary purpose, and it can be appreciated by those skilled in the art that embodiments of the present disclosure are not limited thereto.

In one embodiment, the set of predefined transmission modes, from which a transmission mode is selected in block 410, may include a periodical transmission mode and/or an on-demand transmission mode. In another embodiment, the set of predefined transmission modes may include a plurality of periodical transmission modes with different transmission period configurations. Additionally, or alternatively, the set of predefined transmission modes may include multiple on-demand transmission modes with different configurations, for example, different triggering events or thresholds, or other parameters for defining a MRS transmission. In another embodiment, the transmission period for the periodical transmission mode may be configurable. For example, the period may be indicated to UE via a dedicated higher layer signaling, or a broadcast signaling.

In one embodiment, one of the set of predefined transmission modes can be a periodical mode (also referred to as 'MRS-always-on mode') and another transmission mode within the set can be an on-demand transmission mode (also referred to as 'MRS-on-demand' mode). For the MRS-always-on mode, all MRSs of an AN are transmitted periodically via beam scanning UE can measure the MRS when it is necessary. For the MRS-on-demand mode, MRSs of an AN are transmitted only when it is necessary, for example, when receiving signal quality of UE falls below a predefined threshold. For the MRS-on-demand mode, which MRS to transmit can be determined according to certain condition, for example position of one or more UEs in question.

In one embodiment, in block 410, selecting a transmission mode from a set of predefined transmission modes may include selecting the transmission mode from the set of predefined transmission modes based on one or more relevant factors. As shown in block 411 of FIG. 4b which illustrates possible implementations for block 410, examples of such factors include, but are not limited to, one or more of the following:

Traffic load of the access node,

Traffic load of a cluster of access nodes that include the access node,

Traffic load of the wireless communication system,

An area that needs fast mobility procedure,

Moving speed of the device,

Moving speed of a further device in the wireless communication system, and

A latency requirement for an on-going session.

In one embodiment, the selecting operation shown in block 411 may be performed at each access node. For example, when traffic load of an access node is high and/or the number of high speed UEs is high, the network (that is, the access node in this example) may select MRS-always-on mode from the set of predefined transmission modes, since under such condition, the on-demand transmission mode may not save signaling overhead, and/or, the delay introduced by the on-demand transmission mode may be unacceptable for the high speed UEs. Additionally, or alternatively, when the traffic load of the access node is/becomes low and the number of high mobility UEs is low, the network can change the MRS transmission mode to the MRS-on-demand mode.

Figure 4B:
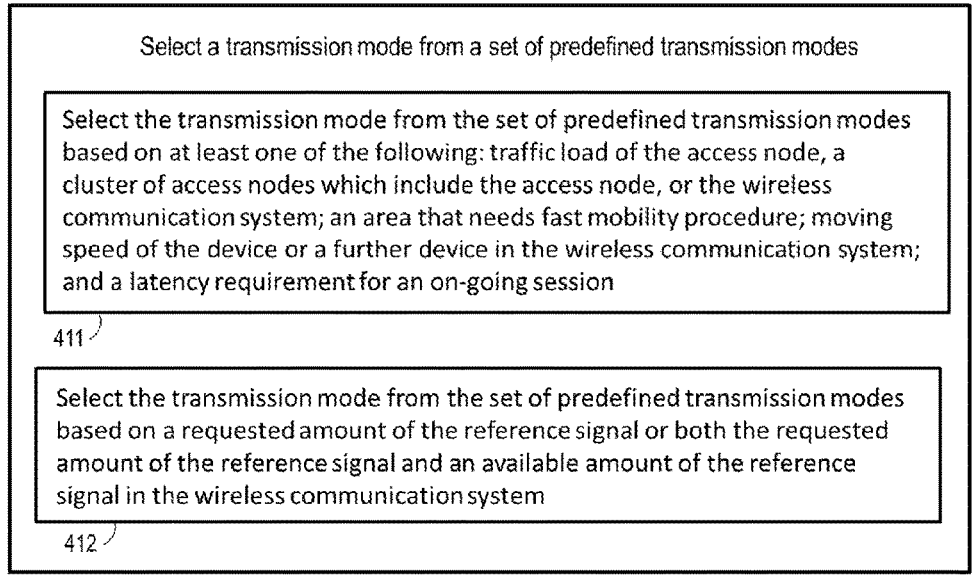

In another embodiment, the access node may select a transmission mode from the set of predefined transmission modes based on a requested amount of the reference signal, or, both the requested amount of the reference signal and an available amount of the reference signal in the access node, as shown in block 412 of FIG. 4b. For example, when the requested amount of the reference signal is higher than a threshold, and/or, when the ratio between the requested reference signal and the total reference signal available in the periodical transmission mode is higher than a threshold, and/or, when a difference between the requested reference signal and the total reference signal available in the periodical transmission mode is lower than a threshold, the transmission mode can be selected to be the periodical transmission mode. In another example, when the ratio between the requested reference signal and the total reference signal provided by the periodical transmission mode with a first period configuration is higher than a threshold, the periodical transmission mode with the first period configuration can be selected.

Figure 4C:
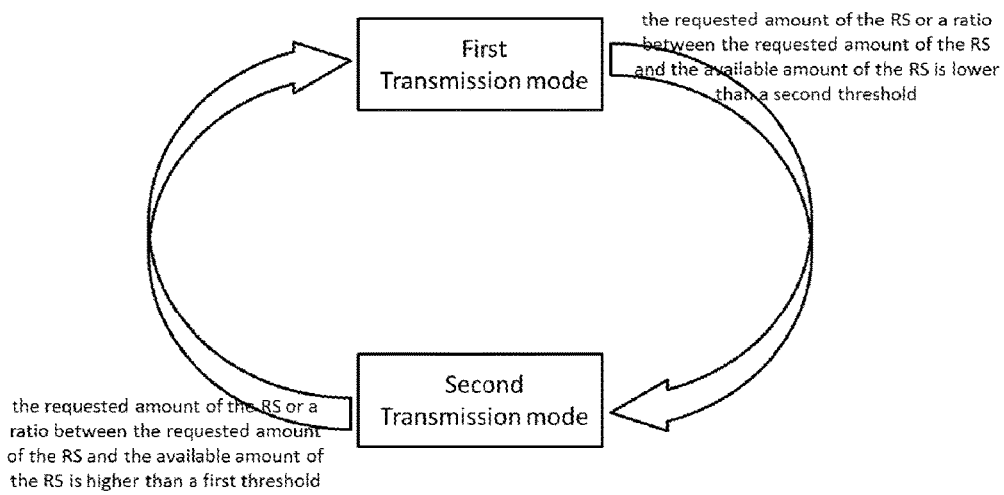

To avoid too frequent mode switch, for example, between a periodical transmission mode and an on-demand transmission mode, in one embodiment, a hysteresis and/or two different thresholds can be introduced in the transmission mode selection operation. For instance, two different thresholds can be utilized to control the mode switch. FIG. 4c illustrates a schematic state transition diagram of mode switching between a first transmission mode and a second transmission mode based on two different thresholds. As shown in FIG. 4c, when the requested amount of RS or a ratio between the requested amount of the RS and the available amount of RS is higher than a first threshold, and/or, when a difference between the requested reference signal and the total reference signal available in the first transmission mode is lower than a threshold, the transmission mode can be switched from the second transmission mode to the first transmission mode. When the requested amount of RS or a ratio between the requested amount of the RS and the available amount of RS is lower than a second threshold, and/or, when a difference between the requested reference signal and the total reference signal available in the first transmission mode is higher than a threshold, the transmission mode can be switched from the first transmission mode to the second transmission mode. In this example, by setting the second threshold lower than the first threshold by an offset, too frequent switching can be avoided. In one embodiment, the first transmission mode can be a periodical transmission mode for MRS, and the second transmission mode can be an on-demand transmission mode for MRS, however, embodiments of the disclosure are not limited thereto.

Additionally, or alternatively, it can be defined that only when the requested amount of the RS or the ratio between the requested amount of the RS and the available amount of RS is lower/higher than a threshold for a predefined hysteresis, the transmission mode can be switched. It also helps avoiding frequent mode switching.

In one embodiment, the transmission mode may be selected based on a specific area where fast mobility procedure is required. For instance, in some area (such as a corner or the like), signal quality of a source AN drops quickly, then for UEs located in this area, a mobility procedure with low latency is required. That is, to support UEs in such an area, a transmission mode which provides low latency such as the always-on transmission mode may be selected.

In another embodiment, a transmission mode providing low latency such as the always-on transmission mode may be selected by an access node to satisfy a latency requirement for an on-going session.

Figure 4D:
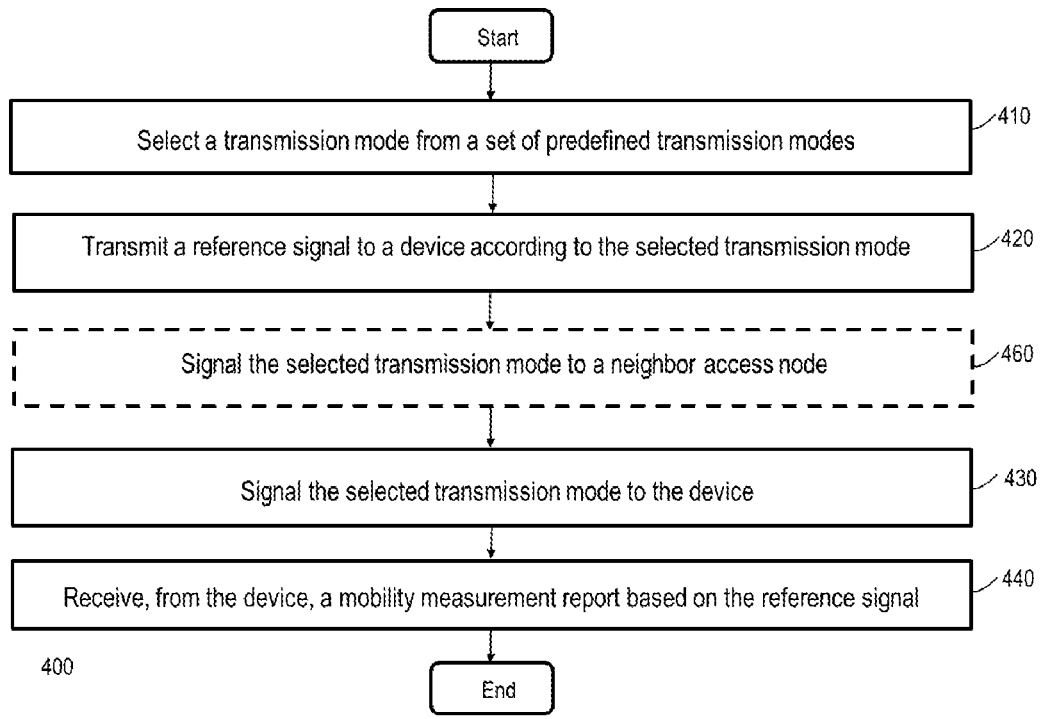

Optionally, after selecting the transmission mode in block 410, the access node may signal the selected transmission node to a neighbor access node, for example, in block 460 shown in FIG. 4d. The AN may inform its neighbor ANs whenever its MRS transmission mode is changed. It enables the neighbor AN to configure reference signal measurement for its UEs properly. For example, when the access node 202 shown in FIG. 2 selects an on-demand MRS transmission mode and signals the transmission mode to the neighbor access node 201 shown in FIG. 2, the access node 201 determines that MRS from the access node 202 is not always available. Then the access node 201 can configure its UEs not to measure the MRS from the access node 202 when the MRS is not transmitted.

In another embodiment, the selecting operation shown in block 410 may be performed at AN cluster level, for example, the transmission mode may be selected by a node serving as a cluster head. The selection may be done based on one or more of the following: traffic load of a cluster of access nodes, the number of high mobility UEs in the cluster, a latency requirement for an on-going session in the cluster, required amount of reference signals in the cluster, and the like. Then the selected transmission mode may be informed to at least one other access nodes in the cluster via inter-node signaling, for example in block 460. It enables some of the ANs in the cluster to apply same transmission mode for the reference signal.

Figure 4E:
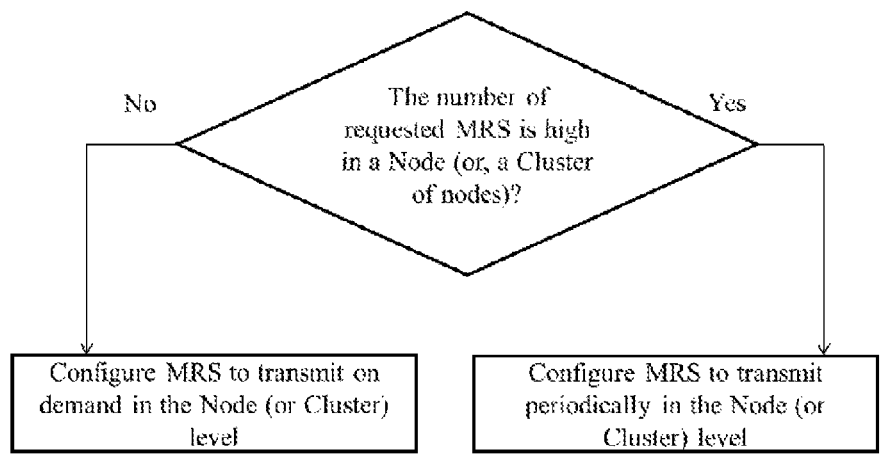

FIG. 4e shows a flow chart illustrating the transmission mode selection and configuration at access node level or cluster level. First, it is determined whether a predefined condition is satisfied (whether number of requires MRS is high, in this example). Then a transmission mode is selected and configured accordingly. These operations can be considered as an alternative implementation of block 410 of FIG. 4a.

Figure 4F:
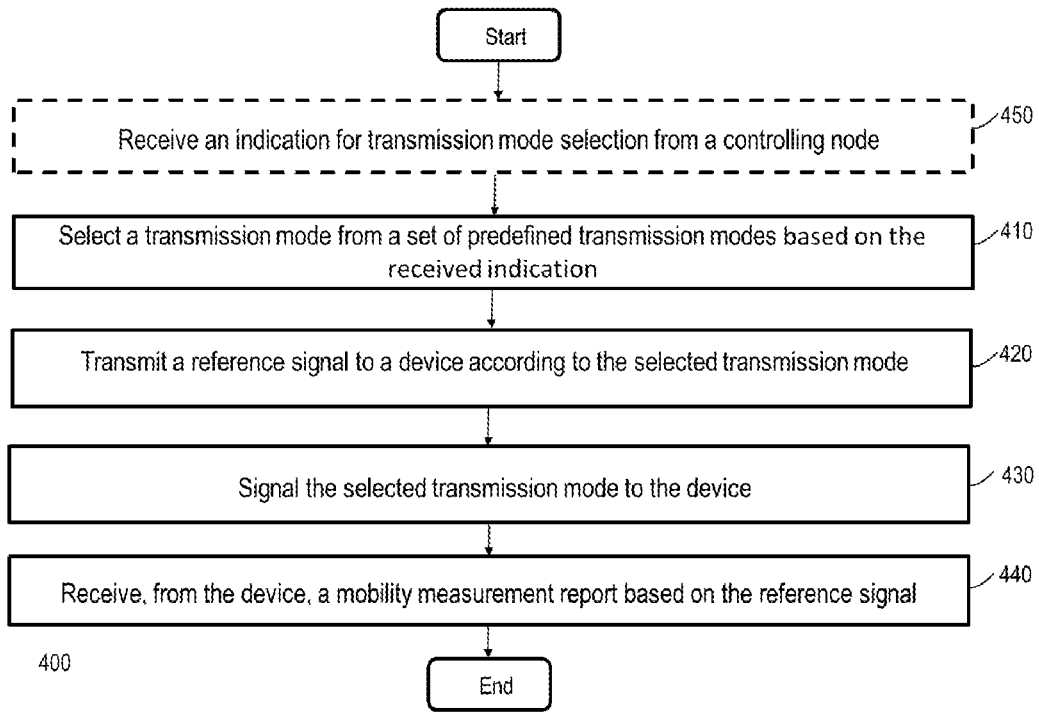

In one embodiment, a transmission mode may be selected or changed at system level. In this embodiment, a network controller can monitor the MRS transmission in system level and determines whether to change the MRS transmission mode according to certain triggering mechanism, for example based on at least one of the factors shown in block 411 of FIG. 4b. In one example, an access node in the system may be informed of the transmission mode to be applied by the network controller. That is, in this example, the method 400 may further comprise receiving, from a controlling node in the wireless communication system, an indication for transmission mode selection (block 450), as shown in FIG. 4f. The indication may specify the transmission mode to select, or contain information related to transmission mode selection. In this example, in block 410, the selection of a transmission mode from a set of predefined transmission modes may comprise selecting the transmission mode from the set of predefined transmission modes based on the indication received in block 450.

Figure 4G:
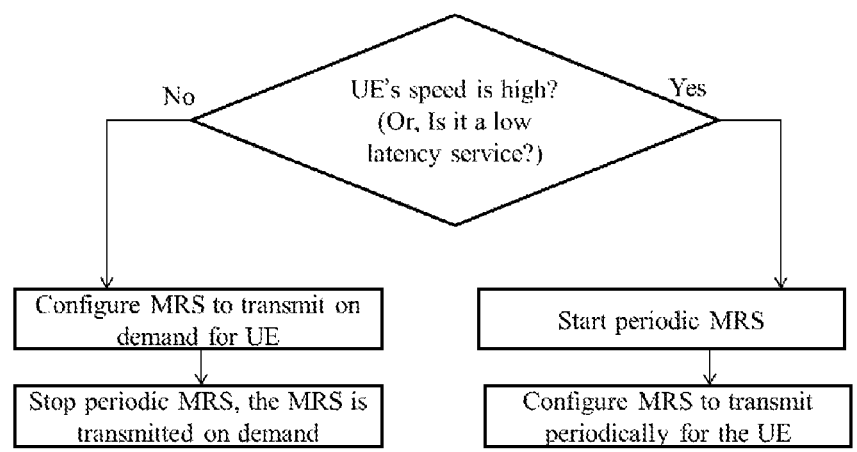

Likewise, in one embodiment, the transmission mode may be selected in a way specific to the UE. That is to say, the selected transmission mode may be specific to the UE. Some UEs such as the UEs with high mobility or the UEs with low latency service may require low latency during handover. According to change in the moving speed of a UE, a serving AN can request the neighboring ANs to send MRS periodically or on-demand for the UE. For example, transmission mode for the reference signals to be measured by UE with high mobility (e.g. moving speed is higher than a first threshold) or low latency service, may be selected as a periodical transmission mode. Additionally, periodicity associated with the periodical transmission mode may depend on the UE mobility and requirement. It can be appreciated that in this embodiment, transmission modes for RS to be measured by different UEs can be selected separately. For instance, an on-demand transmission mode may be selected for the MRS with beam 1 shown in FIG. 2, while a periodical transmission mode may be selected for the MRS with beam 3 shown in FIG. 2. One exemplary flow chart for UE-specific transmission mode selection and transmission is illustrated in FIG. 4g. As shown in FIG. 4g, depending on the UE speed or latency requirement for the UE, corresponding transmission mode is selected for the RS to be measured by the UE.

It should be noted that, in other embodiments where the transmission mode selection is performed at access node level, cluster level, or system level, the transmission mode for different RSs can also be selected separately. That is to say, the UE-specific transmission mode selection may be implemented in combination with other embodiments.

After the transmission mode is selected, the access node will inform the transmission mode to UE, as shown in block 430 of FIG. 4a. In one embodiment, the access node may transmit the selected transmission mode to UE via a broadcasting signaling, for example, as a part of the system information, as shown in block 431 of FIG. 4h. The system information can be updated when the configuration is changed. This is advantageous especially when the transmission mode is common to all UEs.

Figure 4H:
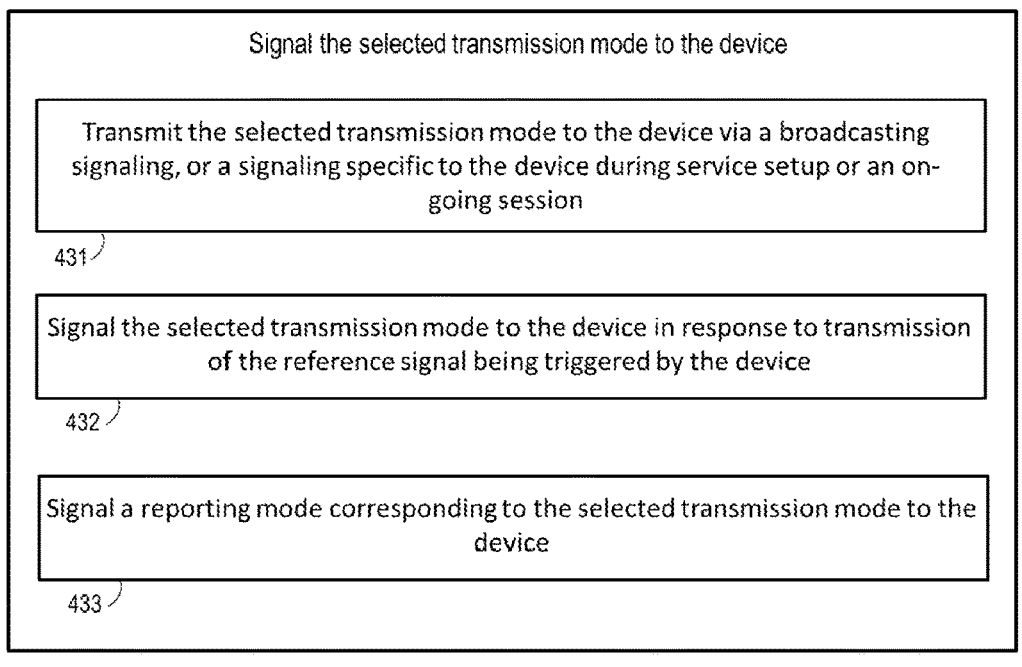

As shown in block 431 of FIG. 4h, in another embodiment where a UE-specific transmission mode is selected, the access node may indicate the selected transmission mode to UE via a signaling specific to the UE during service setup or an on-going session. For example, an indication of the selected transmission mode may be transmitted via a UE-specific radio resource control (RRC) signaling or media access control (MAC) signaling. It should be noted that embodiments of the present disclosure are not limited to any specific signaling for the transmission indication in block 430. Any suitable type of signaling can be used. When a transmission mode for reference signals to be measured by the UE changes, the access node can inform the change to UE in block 430. By way of example, the transmission mode changes when a MRS always-on transmission node is deactivated and an on-demand MRS transmission mode of a neighbor node is activated. The change of transmission mode can be triggered by a variety of events, including, but not limited to, serving beam for UE being switched from one AN to another, or change of UE's moving speed. For example, when UE's moving speed falls below a predefined first threshold plus an offset, the transmission mode can be changed from always-on to on-demand, or when UE's moving speed exceeds a predefined second threshold plus an offset, transmission mode can be changed from on-demand to always-on. By introducing two different thresholds (and an offset), ping-pong effect can be avoided.

In another embodiment, in block 430, the access node may signal the selected transmission mode to the device in response to transmission of the reference signal being triggered by the device, as shown in block 432 of FIG. 4h. For instance, although a MRS can be transmitted periodically, information on this periodical transmission mode may not be informed to all UEs. That is to say, some UEs with no requirement for MRS measurement may not be aware of the transmission mode, or some UEs with requirement for MRS measurement may assume an on-demand MRS transmission mode. In this way, the active and de-active MRS messages between nodes can be saved, and the latency due to inter-Node signaling during beam switching can be reduced as well. Only when the UE triggers a MRS transmission, the network can inform the corresponding MRS transmission mode.

Figure 4I:
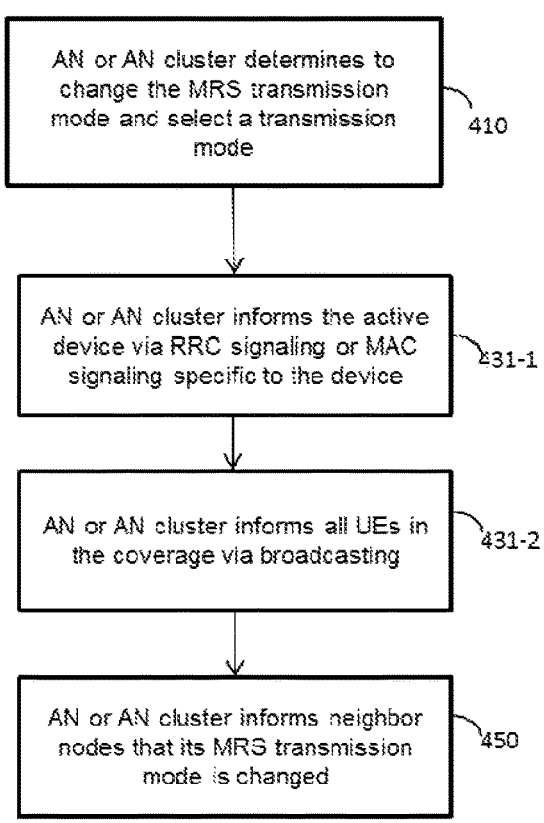

In FIG. 4i, an example for transmission mode selection and corresponding signaling is presented. In this example, the transmission mode can be selected at AN level or at AN cluster level in block 410, and then the AN or AN cluster may signal the selected transmission mode to UEs via multiple signalings. That is, different UEs may obtain an indication of the selected transmission mode via different signaling. For active UEs, RRC or MAC signaling can be used as shown in block 431-1, while other UEs can be informed via broadcast signaling, as shown in block 431-2. In this example, the AN or AN cluster also signal the transmission mode to neighbor ANs in block 450. It would be appreciated that some blocks shown in FIG. 4i can be omitted in other embodiments.

In one embodiment, each transmission mode in the set of predefined transmission modes may have a corresponding report mode. That is to say, different transmission modes for RSs may require measurement results based on the RSs to be reported in different modes. To enable transmission mode-specific report mode, in addition to the selected transmission mode to the device in block 430, the access node may also signal a reporting mode corresponding to the selected transmission mode, as shown in block 433 of FIG. 4h. It enables to optimize the measurement reporting procedure based on the configured RS transmission mode, to save signaling and/or power.

For instance, if the selected transmission mode is a periodical transmission mode, in block 433, the access node may signal an event-triggered report mode for the mobility measurement report. With the event-triggered report mode configured, the UE can send the measurement report when certain condition is fulfilled, for example, when one neighboring beam becomes better than the serving beam by a predefined offset; otherwise, no measurement report is reported. The event-triggered report mode also allows the AN to send one command ordering the UE to send a measurement report, when the network needs the measurement report. Based on such event-triggered measurement report, the network can determine the beam switch for the UE.

Additionally, or, alternatively, if the selected mode is an on-demand transmission mode, the access node may signal a measurement command based report mode for the mobility measurement report. That is to say, the UE can be configured to report the measurement results according to each MRS measurement command, in such case. Based on the measurement reports, the network determines the best beam for the UE. If the best beam is different from the current serving beam, beam switch can be triggered.

In one embodiment, the reporting mode corresponding to the selected transmission mode may be signaled to the UE implicitly. For example, when there is a predefined mapping between a transmission mode and a reporting mode, the UE can derive the reporting mode when receive indication for a transmission mode. In another embodiment, the reporting mode corresponding to the selected transmission mode may also be signaled to the UE via explicit signaling (e.g., RRC signaling), separately or together with the indication for transmission mode. In still another embodiment, the access node may transmit a reporting mode indicator explicitly in block 410 to UE, while indicating the selected transmission mode implicitly.

As shown in FIG. 4a, the access node receives, from the device, a mobility measurement report based on the reference signal, in block 440. In one embodiment, the mobility measurement report may be transmitted by the device periodically, or based on certain triggering event. For example, the mobility measurement report may be transmitted by the device when received signal power from the current serving node falls below a threshold. In another embodiment, in case that the access node also signals a reporting mode to the device, as described with reference to block 433 of FIG. 4h, the mobility measurement report may be transmitted by the device according to the configured reporting mode.

In one embodiment, the mobility measurement report received in block 440 may be used for intra-node beam switch or inter-node beam switch. It can be appreciated that the mobility measurement report may be used for any other suitable purposes by the access node, in other scenarios.

Figure 5A:
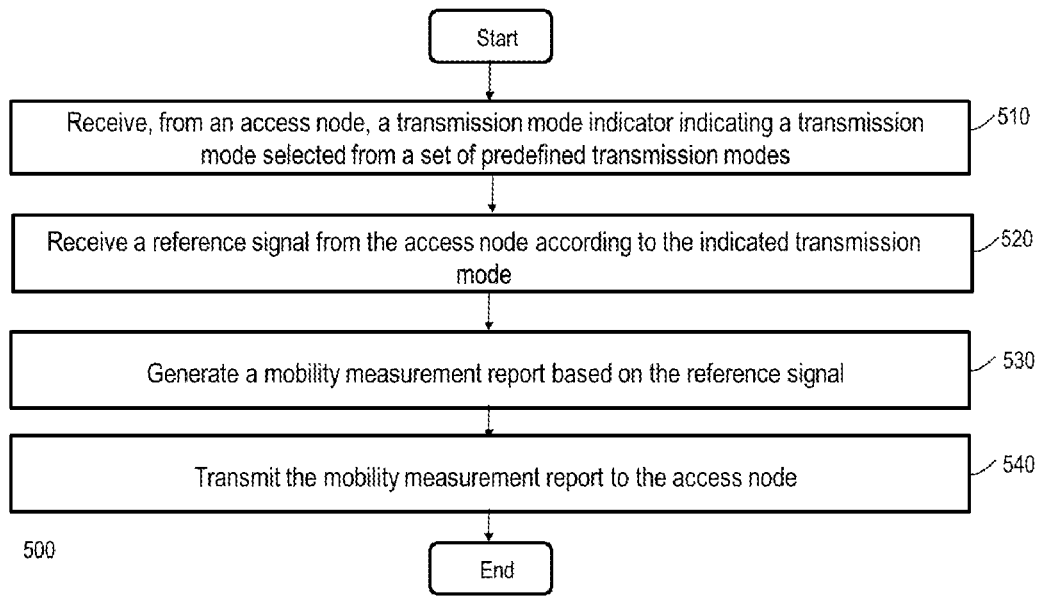
FIGS. 5a-5b illustrate flowcharts of a method 500 for wireless communication according to an embodiment of the present disclosure.

Reference is now made to FIG. 5a, which illustrates a flowchart of a method 500 implemented by a device (for example, one of UE 203 to 206 shown in FIG. 2) in a wireless communication system for beam switch.

As illustrated, the method 500 comprises receiving, from an access node (for example, AN 201 or 202 shown in FIG. 2), a transmission mode indicator indicating a transmission mode selected from a set of predefined transmission modes (in block 510); receiving a reference signal from the access node according to the indicated transmission mode (in block 520); generating a mobility measurement report based on the reference signal (in block 530); and transmitting the mobility measurement report to the access node (in block 540).

In one embodiment, the transmission mode indicator received in block 510 can be that transmitted in block 410 of method 400. As such, the selected transmission mode and the set of predefined transmission modes as described with reference to the method 400 also apply here. For example, the set of predefined transmission modes may include at least one of a periodical transmission mode and an on-demand transmission mode, and therefore details will not be repeated here. In one embodiment, the indicated transmission mode can be specific to the UE. That is, the access node can indicate a different transmission mode to another UE.

Figure 5B:
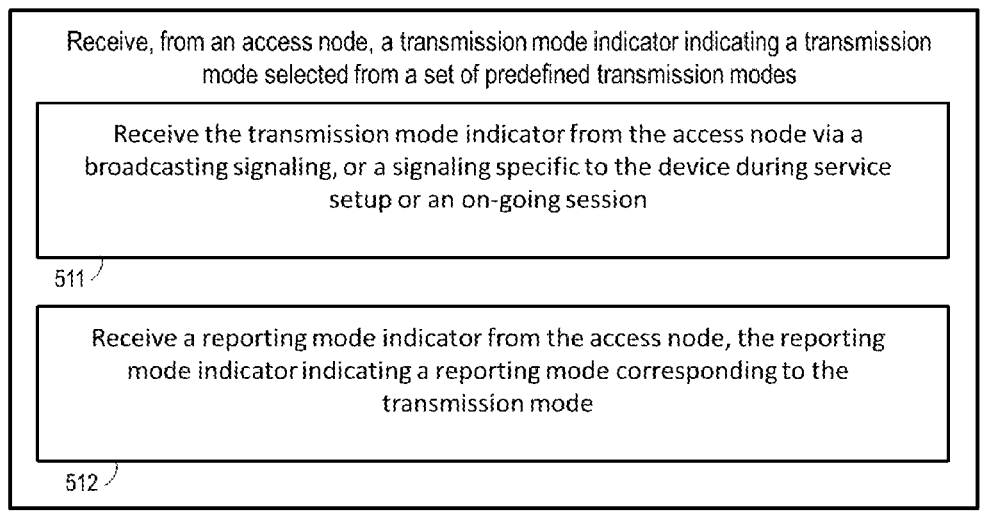

FIG. 5b illustrates possible implementations for block 510. As shown, in one embodiment, the transmission mode indicator from the access node may be received by UE via a broadcasting signaling in block 511. Alternatively, in another embodiment, the transmission mode indicator may be received via a signaling specific to the device during service setup or an on-going session in block 511, for example. Different UEs may receive the transmission mode indicator via different signaling. As can be seen from FIG. 4i, an active UE may receive the transmission mode indicator via RRC or MAC signaling, while other UEs may receive the indicator by monitoring broadcast signaling.

In one embodiment, the device may receive a reporting mode indicator indicating a reporting mode corresponding to the transmission mode, from the access node, as shown in block 512 of FIG. 5b. For example, the UE may receive, from the AN, a reporting mode indicator indicating an event-triggered reporting mode for the mobility measurement report, if the transmission mode is a periodical transmission mode. Additionally, or alternatively, the UE may receive a reporting mode indicator indicating a measurement command based reporting mode for the mobility measurement report, if the transmission mode is an on-demand transmission mode.

In block 510 or 512, in one embodiment, the reporting mode indicator may be received as an explicit and separate signaling or a separate field of a signaling. In another embodiment, the reporting mode indicator can also be derived by the device implicitly based on the received transmission mode indicator. In still another embodiment, the device may receive an explicit reporting mode indicator in block 510, and then derive the transmission mode indicator implicitly.

In one embodiment, the reference signal received in block 520 may be the reference signal transmitted by an access node in block 420 of method 400. As described with reference to method 400, in one embodiment, the reference signal can be MRS enabling measurement for a beam in a beam switch procedure. It can be appreciated that embodiments of the disclosure are not limited thereto, and what received in block 520 can be other reference signal in another embodiment.

Likewise, in one embodiment, the mobility measurement report generated in block 530 and transmitted in block 540 may be that received by the access node in block 440 of FIG. 4a. As described with reference to method 400, the mobility measurement report may be used for intra-node or inter-node beam switch, however, utilization of the mobility measurement report for other or additional purpose is not excluded.

When a reporting mode indicator is received in block 510 or 512, the UE may transmit the mobility measurement report to the access node based on the indicated/configured reporting mode, in block 540. In case that no reporting mode indicator is received, the UE may transmit the mobility measurement report to the access node based on a predefined/default configuration, for example.

Although the operations of methods 400 and 500 are illustrated in a specific order in the FIGS. 4a-5b, those skilled in the art shall understand that some operations may be performed in a reverse order or in parallel. For example, the operations in blocks 420 and 430 of FIG. 4a may be performed in a reverse order, and/or, the operations in blocks 430 and 460 of FIG. 4d may be performed in a reverse order. Therefore, the order as specified in the figures is merely illustrative instead of limiting.

Figure 6:
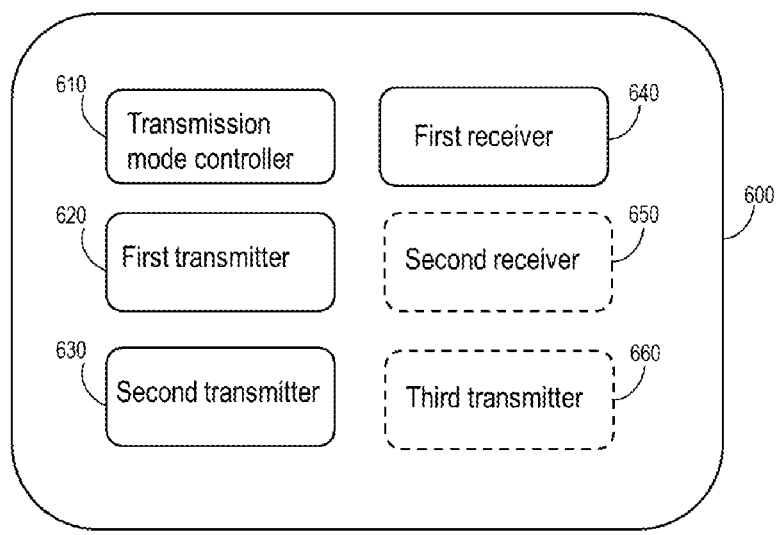
FIG. 6 illustrates a schematic block diagram of an apparatus 600 in an access node for wireless communication according to an embodiment of the present disclosure.

Reference is now made to FIG. 6, which illustrates a schematic block diagram of an apparatus 600 in an access node. The access node may be, for example, AN 201 or 202 shown in FIG. 2, and may be involved in a beam switch procedure in a wireless communication system (e.g., the wireless system 200 shown in FIG. 2). The apparatus 600 is operable to carry out the exemplary method 400 described with reference to FIGS. 4a-4i and possibly any other processes or methods. It is also to be understood that the method 400 is not necessarily carried out by the apparatus 600. At least some steps of the method 400 can be performed by one or more other entities.

As illustrated in FIG. 6, the apparatus 600 comprises a transmission mode controller 610, configured to select a transmission mode from a set of predefined transmission modes; a first transmitter 620, configured to transmit a reference signal to a device (e.g., one of the UEs 203 to 206) according to the selected transmission mode; a second transmitter 630, configured to signal the selected transmission mode to the device; and a first receiver 640, configured to receive, from the device, a mobility measurement report based on the reference signal. Since the apparatus 600 can select transmission mode for the reference signal adaptively according to different situations, signaling overhead can be reduced and mobility performance can be improved.

In one embodiment, the transmission mode controller 610, the first transmitter 620, the second transmitter 630 and the first receiver 640 can be configured to perform the operations described with reference to blocks 410, 420, 430 and 440 of method 400, respectively, and thus descriptions with reference to blocks 410, 420, 430 and 440 also apply here. Therefore, some details will not be repeated here.

As described with reference to method 400, in one embodiment, the reference signal can be, but not limited to, MRS enabling measurement for a beam in a beam switch procedure.

In another embodiment, the set of predefined transmission modes may include at least one of a periodical transmission mode and an on-demand transmission mode.

The transmission mode controller 610 can be configured, in one embodiment, to select the transmission mode from the set of predefined transmission modes based on at least one of the following, as shown in block 411 of FIG. 4b:

Traffic load of the access node or a cluster of access nodes or the wireless communication system;
An area that needs fast mobility procedure;
Moving speed of the device and/or a further device in the wireless communication system; and
A latency requirement for an on-going session of the access node or a cluster of access nodes, or the wireless communication system.

In another embodiment, the transmission mode controller 610 can be configured to select a transmission mode from the set of predefined transmission modes based on a requested amount of the reference signal, or both the requested amount of the reference signal and an available amount of the reference signal in the wireless communication system, as shown in block 412 of FIG. 4b. For example, the transmission mode can be selected based on a difference or a ratio between the requested amount of the reference signal and the available amount of the reference signal in certain transmission mode. As described with method 400, by introducing two different thresholds for comparing with the requested amount of the reference signal or a ratio (or, a difference) between the requested amount of the reference signal and an available amount of the reference signal, and/or by introducing a predefined hysteresis into the comparison, Ping-Pong effect (i.e., too frequency transmission mode switch) can be avoided. One example of the selection operation based on requested amount of the reference signal can be found in FIG. 4c.

In one embodiment, the apparatus 600 may further comprise a second receiver 650, which can be configured to receive from a control node in the wireless communication system, an indication for transmission mode selection, and in this embodiment, the transmission mode controller 610 may be configured to select the transmission mode based on the received indication.

The selected transmission mode can be signaled to the device (e.g., one of the UEs 203 to 206 shown in FIG. 2), by the second transmitter 630, via a broadcasting signaling or a signaling specific to the device during service setup or an on-going session as shown in FIG. 4h. Embodiments of the disclosure are not limited to any specific signaling format, and exact signaling to be used may depend on UE status (e.g., whether in active mode), and/or, transmission mode selection strategy (e.g., whether transmission mode is selected in UE-specific way).

Additionally or alternatively, the second transmitter 630 may signal the selected transmission mode to the device in response to transmission of the reference signal being triggered by the device, as shown in block 432 of FIG. 4h.

In one embodiment, the selected transmission mode may be specific to the device.

In one embodiment, the second transmitter can be configured to signal a reporting mode corresponding to the selected transmission mode to the device. The reporting mode may be signaled by the second transmitter implicitly or explicitly, as described with reference to method 400.

There can be at least one reporting modes associated with each transmission mode, and in one embodiment, the second transmitter may be configured to signal an event-triggered reporting mode for the mobility measurement report, if the transmission mode is a periodical transmission mode, and/or, signal a measurement command based reporting mode for the mobility measurement report, if the transmission mode is an on-demand transmission mode.

In another embodiment, the apparatus 600 may further comprise a third transmitter 660 configured to signal the selected transmission mode to a neighbor access node in the wireless communication system.

As described with method 400, in one embodiment, the mobility measurement report received by the first receiver 640 may be used for intra-node or inter-node beam switch. However, the mobility measurement report can also be used for other purpose/operation in other embodiments.

Figure 7:
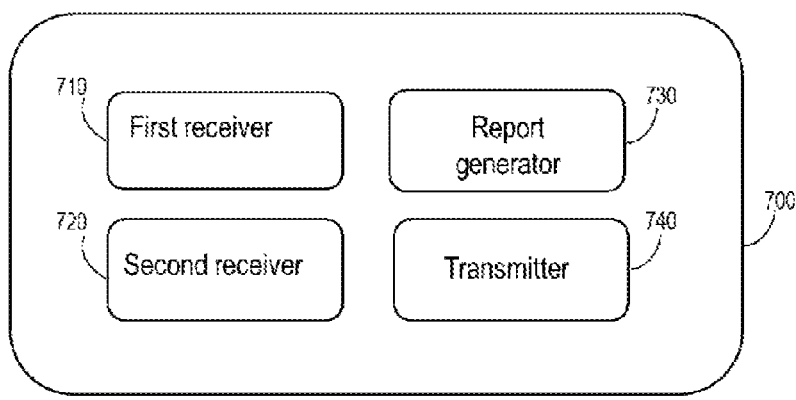
FIG. 7 illustrates a schematic block diagram of an apparatus 700 in a device for wireless communication according to an embodiment of the present disclosure.

FIG. 7 illustrates a schematic block diagram of an apparatus 700 in a device in a wireless communication system for beam switch according to an embodiment of the present disclosure. In one embodiment, the apparatus 700 may be embodied in/as UE, for example UE 203 as shown in FIG. 2. The apparatus 700 is operable to carry out the example method 500 described with reference to FIGS. 5a-5b and possibly any other processes or methods. It is to be understood that the method 500 is not necessarily carried out by the apparatus 700. At least some steps of the method 500 can be performed by one or more other entities.

Particularly, as illustrated in FIG. 7, the apparatus 700 comprises a first receiver 710 configured to receive, from an access node, a transmission mode indicator indicating a transmission mode selected from a set of predefined transmission modes; a second receiver 720 configured to receive a reference signal from the access node according to the indicated transmission mode; a report generator 730 configured to generate a mobility measurement report based on the reference signal; and a transmitter 740 configured to transmit the mobility measurement report to the access node.

In one embodiment, the apparatus may communicate with the apparatus 600. That is, the transmission mode indicator received by the first receiver 710 may be that transmitted by the second transmitter 630, and the reference signal received by the second receiver may be that transmitted by the first transmitter 620, and the mobility measurement report transmitted by the transmitter 740 may be that received by the first receiver 640. Then description related to the transmission mode indicator, the set of predefined transmission mode, the reference signal and the mobility measurement report, provided with reference to apparatus 600 also apply here.

In one embodiment, the first receiver 710, the second receiver 720, the report generator 730 and the transmitter 740 can be configured to perform the operations described with reference to blocks 510, 520, 530 and 540 of method 500, respectively, and thus descriptions with reference to blocks 510 to 540 also apply here, and some details will not be repeated.

As described with reference to method 500 and apparatus 600, in one embodiment, the reference signal can be, but not limited to, MRS enabling measurement for a beam in a beam switch procedure. In another embodiment, the set of predefined transmission modes may include at least one of a periodical transmission mode and an on-demand transmission mode.

In one embodiment, the indicated transmission mode may be specific to the device.

In one embodiment, the first receiver 710 can be configured to receive the transmission mode indicator from the access node via a broadcasting signaling, or a signaling specific to the device during service setup or an on-going session. In another embodiment, the first receiver can be configured to receive from the access node a reporting mode indicator indicating a reporting mode corresponding to the transmission mode, and in this embodiment, the transmitter 740 can be further configured to transmit the mobility measurement report to the access node based on the reporting mode.

There can be at least one reporting modes associated with each transmission mode, and in one embodiment, the first receiver 710 of the apparatus 700 can be configured to receive from the access node a reporting mode indicator indicating an event-triggered reporting mode for the mobility measurement report, if the transmission mode is a periodical transmission mode, and/or receive from the access node, a reporting mode indicator indicating a measurement command based reporting mode for the mobility measurement report, if the transmission mode is an on-demand transmission mode. However, embodiments of the present disclosure are not limited to any particular relationship between a reporting mode and a transmission mode.

Figure 8:
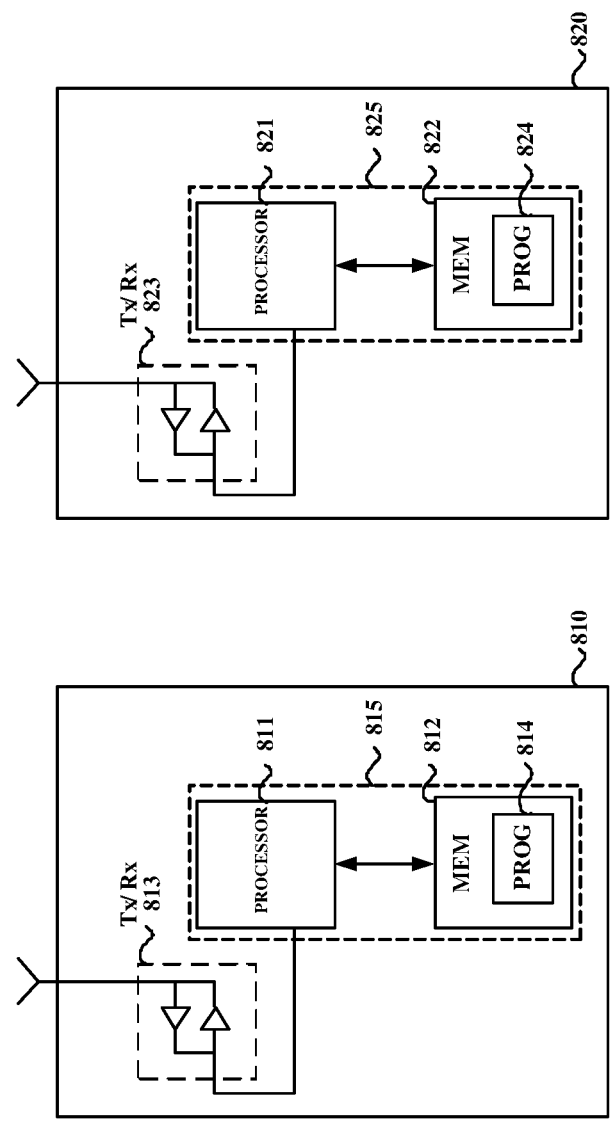
FIG. 8 illustrates a simplified block diagram of an apparatus 810 that may be embodied as/in an access node, and an apparatus 820 that may be embodied as/in a device.

FIG. 8 illustrates a simplified block diagram of an apparatus 810 that may be embodied in/as an access node, e.g., the AN 201 or 202 shown in FIG. 2, and an apparatus 820 that may be embodied in/as a device, e.g., one of the UEs 203 to 206 shown in FIG. 1.

The apparatus 810 may comprise at least one processor 811, such as a data processor (DP) and at least one memory (MEM) 812 coupled to the processor 811. The apparatus 810 may further comprise a transmitter TX and receiver RX 813 coupled to the processor 811. The MEM 812 stores a program (PROG) 814. The PROG 814 may include instructions that, when executed on the associated processor 811, enable the apparatus 810 to operate in accordance with the embodiments of the present disclosure, for example to perform the method 400. A combination of the at least one processor 811 and the at least one MEM 812 may form processing means 815 adapted to implement various embodiments of the present disclosure.

The apparatus 820 comprises at least one processor 821, such as a DP, and at least one MEM 822 coupled to the processor 821. The apparatus 820 may further comprise a suitable TX/RX 823 coupled to the processor 821. The MEM 822 stores a PROG 824. The PROG 824 may include instructions that, when executed on the associated processor 821, enable the apparatus 820 to operate in accordance with the embodiments of the present disclosure, for example to perform the method 500. A combination of the at least one processor 821 and the at least one MEM 822 may form processing means 825 adapted to implement various embodiments of the present disclosure.

Various embodiments of the present disclosure may be implemented by computer program executable by one or more of the processors 811 and 821, software, firmware, hardware or in a combination thereof.

The MEMs 812 and 822 may be of any type suitable to the local technical environment and may be implemented using any suitable data storage technology, such as semiconductor based memory devices, magnetic memory devices and systems, optical memory devices and systems, fixed memory and removable memory, as non-limiting examples.

The processors 811 and 821 may be of any type suitable to the local technical environment, and may include one or more of general purpose computers, special purpose computers, microprocessors, digital signal processors DSPs and processors based on multicore processor architecture, as non-limiting examples.

Although the above description is made in the context of a 5G network, it should not be construed as limiting the spirit and scope of the present disclosure. The principle and concept of the present disclosure may be more generally applicable to other radio networks, for example an ad-hoc network.

Furthermore, though some embodiments of the disclosure are described in a context of beam switch, it should not be construed as limiting the spirit and scope of the present disclosure. The principle and concept of the present disclosure may be more generally applicable to other wireless communication scenarios where beam switch may not be exploited, to reduce signaling overhead and improve measurement.

In addition, the present disclosure may also provide a carrier containing the computer program as mentioned above, wherein the carrier is one of an electronic signal, optical signal, radio signal, or computer readable storage medium. The computer readable storage medium can be, for example, an optical compact disk or an electronic memory device like a RAM (random access memory), a ROM (read only memory), Flash memory, magnetic tape, CD-ROM, DVD, Blue-ray disc and the like.

The techniques described herein may be implemented by various means so that an apparatus implementing one or more functions of a corresponding apparatus described with an embodiment comprises not only prior art means, but also means for implementing the one or more functions of the corresponding apparatus described with the embodiment and it may comprise separate means for each separate function, or means that may be configured to perform two or more functions. For example, these techniques may be implemented in hardware (one or more apparatuses), firmware (one or more apparatuses), software (one or more modules), or combinations thereof. For a firmware or software, implementation may be made through modules (e.g., procedures, functions, and so on) that perform the functions described herein.

Exemplary embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

What is claimed is:

1. A method implemented by an access node in a wireless communication system, comprising:
    selecting a reference signal transmission mode from a set of predefined reference signal transmission modes, wherein the set of predefined reference signal transmission modes includes at least one of a periodical transmission mode and an on-demand transmission mode;
    transmitting a reference signal to a device according to the selected reference signal transmission mode, wherein the reference signal enables measurement for a beam in a beam switch procedure;
    signaling the selected reference signal transmission mode to the device; and
    receiving, from the device, a mobility measurement report based on the reference signal.

2. The method according to claim 1, wherein selecting a transmission mode from a set of predefined transmission modes comprises:
    selecting the transmission mode from the set of predefined transmission modes based on at least one of the following:
    traffic load of the access node,
    traffic load of a cluster of access nodes that include the access node,
    traffic load of the wireless communication system,
    an area that needs fast mobility procedure,
    moving speed of the device,
    moving speed of a further device in the wireless communication system, and
    a latency requirement for an on-going session.

3. The method according to claim 1, wherein selecting a transmission mode from a set of predefined transmission modes comprises:
    selecting the transmission mode from the set of predefined transmission modes based on one of the following:
    a requested amount of the reference signal, and
    the requested amount of the reference signal and an available amount of the reference signal in the wireless communication system.

4. The method according to claim 1, further comprising:
    receiving, from a control node in the wireless communication system, an indication for transmission mode selection,
    wherein selecting a transmission mode from a set of predefined transmission modes comprises selecting the transmission mode from the set of predefined transmission modes based on the received indication.

5. The method according to claim 1, wherein signaling the selected transmission mode to the device comprises:
    transmitting the selected transmission mode to the device via one of the following:
    a broadcasting signaling, and
    a signaling specific to the device during service setup or an on-going session.

6. The method according to claim 1, wherein signaling the selected transmission mode to the device comprises:
    signaling the selected transmission mode to the device in response to transmission of the reference signal being triggered by the device.

7. The method according to claim 1, wherein signaling the selected transmission mode to the device further comprises:
    signaling a reporting mode corresponding to the selected transmission mode to the device.

8. The method according to claim 7, wherein signaling a reporting mode corresponding to the selected transmission mode to the device comprises:
    if the selected transmission mode is a periodical transmission mode, signaling an event-triggered report mode for the mobility measurement report; and
    if the selected mode is an on-demand transmission mode, signaling a measurement command based report mode for the mobility measurement report.

9. The method according to claim 1, further comprising:
    signaling the selected transmission mode to a neighbor access node in the wireless communication system.

10. The method according to claim 1, wherein the selected transmission mode is specific to the device.

11. The method according to claim 1, wherein the mobility measurement report is for intra-node beam switch or inter-node beam switch.

12. An apparatus in a wireless communication system, comprising a processor and a memory, said memory containing instructions executable by said processor whereby said apparatus is operative to perform the method according to claim 1.

13. An apparatus in a wireless communication system, comprising process means adapted to perform the method according to claim 1.

14. A computer program product comprising a non-transitory computer readable medium storing a computer program comprising instructions which, when executed on at least one processor, cause the at least one processor to carry out the method according to claim 1.

15. A method implemented by a device in a wireless communication system, comprising:
   receiving, from an access node, a transmission mode indicator indicating a reference signal transmission mode selected from a set of predefined reference signal transmission modes, wherein the set of predefined reference signal transmission modes includes at least one of a periodical transmission mode and an on-demand transmission mode;
   receiving a reference signal from the access node according to the indicated transmission mode, wherein the reference signal enables measurement for a beam in a beam switch procedure;
   generating a mobility measurement report based on the reference signal; and
   transmitting the mobility measurement report to the access node.

16. The method according to claim 15, wherein receiving, from an access node, a transmission mode indicator comprises:
   receiving the transmission mode indicator from the access node via a broadcasting signaling, or a signaling specific to the device during service setup or an on-going session.

17. The method according to claim 15, wherein receiving, from an access node, a transmission mode indicator further comprises:
   receiving, from the access node, a reporting mode indicator indicating a reporting mode corresponding to the transmission mode, and
   wherein transmitting the mobility measurement report to the access node comprises transmitting the mobility measurement report to the access node based on the reporting mode.

18. The method according to claim 17, wherein receiving, from the access node, a reporting mode indicator indicating a reporting mode corresponding to the transmission mode includes:
   receiving, from the access node, a reporting mode indicator indicating an event-triggered reporting mode for the mobility measurement report, if the transmission mode is a periodical transmission mode, and
   receiving, from the access node, a reporting mode indicator indicating a measurement command based reporting mode for the mobility measurement report, if the transmission mode is an on-demand transmission mode.

19. The method according to claim 15, wherein the indicated transmission mode is specific to the device.

20. The method according to claim 15, wherein the mobility measurement report is for intra-node or inter-node beam switch.

21. An apparatus in wireless communication system, comprising a processor and a memory, said memory containing instructions executable by said processor whereby said apparatus is operative to perform the method according to claim 15.

22. An apparatus in a wireless communication system, comprising process means adapted to perform the method according to claim 15.

23. A computer program product comprising a non-transitory computer readable medium storing a computer program comprising instructions which, when executed on at least one processor, cause the at least one processor to carry out the method according to claim 15.

24. An apparatus in an access node in a wireless communication system, the apparatus being configured to:
   select a reference signal transmission mode from a set of predefined reference signal transmission modes, wherein the set of predefined reference signal transmission modes includes at least one of a periodical transmission mode and an on-demand transmission mode;
   transmit a reference signal to a device according to the selected transmission mode, wherein the reference signal enables measurement for a beam in a beam switch procedure;
   signal the selected transmission mode to the device; and
   receive, from the device, a mobility measurement report based on the reference signal.

25. The apparatus according to claim 24, wherein the apparatus is further configured to:
   select the transmission mode from the set of predefined transmission modes based on at least one of the following:
   traffic load of the access node,
   traffic load of a cluster of access nodes that include the access node,
   traffic load of the wireless communication system,
   an area that needs fast mobility procedure,
   moving speed of the device, moving speed of a further device in the wireless communication system, and
   a latency requirement for an on-going session.

26. The apparatus according to claim 24, wherein the apparatus is further configured to:
   select a transmission mode from the set of predefined transmission modes based on one of the following:
   a requested amount of the reference signal, and
   the requested amount of the reference signal and an available amount of the reference signal in the wireless communication system.

27. The apparatus according to claim 24, further configured to:
   receive, from a control node in the wireless communication system, an indication for transmission mode selection, and
   wherein the apparatus is further configured to select the transmission mode from the set of predefined transmission modes based on the received indication.

28. The apparatus according to claim 24, wherein the apparatus is configured to:
   transmit the selected transmission mode to the device via one of the following:
   a broadcasting signaling, and
   a signaling specific to the device during service setup or an on-going session.

29. The apparatus according to claim 24, wherein the apparatus is configured to:
   signal the selected transmission mode to the device in response to transmission of the reference signal being triggered by the device.

30. The apparatus according to claim 24, wherein the apparatus is configured to:
    signal a reporting mode corresponding to the selected transmission mode to the device.

31. The apparatus according to claim 30, wherein the apparatus is configured to:
    signal an event-triggered reporting mode for the mobility measurement report, if the transmission mode is a periodical transmission mode, and
    signal a measurement command based reporting mode for the mobility measurement report, if the transmission mode is an on-demand transmission mode.

32. The apparatus according to claim 24, further configured to signal the selected transmission mode to a neighbor access node in the wireless communication system.

33. The apparatus according to claim 24, wherein the selected transmission mode is specific to the device.

34. The apparatus according to claim 24, wherein the mobility measurement report is for intra-node or inter-node beam switch.

35. An apparatus implemented in a device in a wireless communication system, the apparatus being configured to:
    receive, from an access node, a transmission mode indicator indicating a reference signal transmission mode selected from a set of predefined reference signal transmission modes, wherein the set of predefined reference signal transmission modes includes at least one of a periodical transmission mode and an on-demand transmission mode;
    receive a reference signal from the access node according to the indicated transmission mode, wherein the reference signal enables measurement for a beam in a beam switch procedure;
    generate a mobility measurement report based on the reference signal; and
    transmit the mobility measurement report to the access node.

36. The apparatus according to claim 35, wherein the apparatus is configured to:
    receive the transmission mode indicator from the access node via a broadcasting signaling, or a signaling specific to the device during service setup or an on-going session.

37. The apparatus according to claim 35, wherein the apparatus is configured to:
    receive, from the access node, a reporting mode indicator indicating a reporting mode corresponding to the transmission mode, and
    wherein the apparatus is further configured to transmit the mobility measurement report to the access node based on the reporting mode.

38. The apparatus according to claim 37, wherein the apparatus is configured to:
    receive, from the access node, a reporting mode indicator indicating an event-triggered reporting mode for the mobility measurement report, if the transmission mode is a periodical transmission mode, and
    receive, from the access node, a reporting mode indicator indicating a measurement command based reporting mode for the mobility measurement report, if the transmission mode is an on-demand transmission mode.

39. The apparatus according to claim 35, wherein the indicated transmission mode is specific to the device.

40. The apparatus according to claim 35, wherein the mobility measurement report is for intra-node or inter-node beam switch.

* * * * *